US008669847B2

(12) United States Patent  
Tyrén

(10) Patent No.: US 8,669,847 B2  
(45) Date of Patent: Mar. 11, 2014

(54) METHOD AND DEVICE FOR IDENTIFYING A TAG BASED ON THE ORIENTATION OF FIBERS

(76) Inventor: Carl Tyrén, Monaco (MC)

( * ) Notice: Subject to any disclaimer, the term of this patent is extended or adjusted under 35 U.S.C. 154(b) by 445 days.

(21) Appl. No.: 13/120,229

(22) PCT Filed: Sep. 21, 2009

(86) PCT No.: PCT/SE2009/000417  
§ 371 (c)(1),  
(2), (4) Date: Jun. 5, 2011

(87) PCT Pub. No.: WO2010/033064  
PCT Pub. Date: Mar. 25, 2010

(65) Prior Publication Data  
US 2011/0248829 A1    Oct. 13, 2011

Related U.S. Application Data

(60) Provisional application No. 61/198,741, filed on Nov. 10, 2008.

(30) Foreign Application Priority Data

Sep. 22, 2008 (SE) .................................. 0802014

(51) Int. Cl.  
*H04Q 5/22* (2006.01)

(52) U.S. Cl.  
USPC ..... 340/10.1; 340/572.7; 340/689; 340/572.4

(58) Field of Classification Search  
None  
See application file for complete search history.

(56) References Cited

U.S. PATENT DOCUMENTS

| 4,476,468 | A | * | 10/1984 | Goldman | ..................... 340/5.86 |
| 4,906,988 | A | * | 3/1990 | Copella | ..................... 340/5.86 |
| 4,940,966 | A | * | 7/1990 | Pettigrew et al. | ............. 340/551 |
| 6,137,411 | A | | 10/2000 | Tyren | |
| 6,225,905 | B1 | | 5/2001 | Tyren et al. | |
| 6,417,771 | B1 | | 7/2002 | Tyren | |
| 7,170,412 | B2 | | 1/2007 | Knox et al. | |
| 7,353,994 | B2 | * | 4/2008 | Farrall et al. | ................. 235/454 |

FOREIGN PATENT DOCUMENTS

| WO | 9729463 A1 | 8/1997 |
| WO | 9729464 A1 | 8/1997 |
| WO | 9953458 A1 | 10/1999 |
| WO | 9966466 A2 | 12/1999 |
| WO | 0075894 A1 | 12/2000 |
| WO | 2006026518 A2 | 3/2006 |

OTHER PUBLICATIONS

International Search Report for PCT/SE2009/000417, Completed by the Swedish Patent Office on Dec. 15, 2009, 4 Pages.

* cited by examiner

*Primary Examiner* — Mohammad Ghayour  
*Assistant Examiner* — Shawna M Kingston  
(74) *Attorney, Agent, or Firm* — Brooks Kushman P.C.

(57) ABSTRACT

The directions of at least two fibers arranged at a tag are detected to identify the tag and an item intended to be attached thereto. The fibers have an impedance for high frequency electromagnetic waves, which impedance is dependent on a magnetic field at the fiber. Electromagnets generate a modulation magnetic field having an amplitude modulated magnetic component with a first frequency; and a bias magnetic field for counterbalancing any constant magnetic fields parallel to the direction of the fiber. A microwave transmitter directs a frequency modulated microwave signal towards the fiber via a transmitting antenna. The microwave reflected by the microfibers is received by a receiving antenna coaxial with the transmitting antenna and is used to identify tag by determining the orientation of the fibers.

11 Claims, 5 Drawing Sheets

METHOD AND DEVICE FOR IDENTIFYING A TAG BASED ON THE ORIENTATION OF FIBERS

CROSS-REFERENCE TO RELATED APPLICATION

This application is the U.S. national phase of PCT Appln. No. PCT/SE2009/000417 filed Sep. 21, 2009, which claims priority to SE application 0802014-1 filed Sep. 22, 2009, and claims the benefit of U.S. provisional application 61/198,741 filed Nov. 10, 2008, the disclosures of which are incorporated in their entirety by reference herein.

FIELD OF INVENTION

The present invention relates to a method and device for identification of articles by means of microfibers arranged in a tag to be attached to the article.

BACKGROUND OF THE INVENTION

WO 99/66466 discloses a method and device for remote detection of objects. Each object is provided with a tag including at least two microfibers arranged at an angle in relation to each other. The angle or angles provide an indication of the identity of the tag and, thus, the identity of the object or article to which it is attached. The microfibers are exposed to a magnetic modulation field having a DC component and an AC component, which influences on the high frequency impedance of the microfiber. The varying impedance modulates a high frequency electromagnetic signal, such as a microwave signal, directed towards the microfiber and the reply signal is modulated by the frequency of said AC component. A second magnetic field is superimposed on said first modulation field. The direction and amplitude of the second magnetic field is adjusted so that the composite magnetic field in the direction of the microfiber is zero, which results in that the AC component of the reply signal of the microwave is effectively doubled. In this way, the direction of the microfiber in relation to the magnetic fields can be calculated.

This method of remote determination of an angular position of several microfibers operates well if the plane of the tag comprising the microfibers is substantially parallel with a reference plane, which is perpendicular to the microwaves and substantially parallel to the magnetic field. However, if the tag is inclined in relation to such a reference plane, the angles become distorted. Moreover, certain angular positions of the microfiber will not produce any reply, which is especially true if the microfiber is perpendicular to the first modulation field.

SUMMARY OF THE INVENTION

Accordingly, an object of the present invention is to mitigate, alleviate or eliminate one or more of the above-identified and other deficiencies and disadvantages singly or in any combination.

According to an aspect of the invention, there is provided a method for detecting directions of at least two fibers arranged at a tag intended to by attached to an item for identification of said item, said fibers having an impedance for high frequency electromagnetic waves, which impedance is dependent on a magnetic field along said fiber; comprising: generating a modulation magnetic field having an amplitude modulated magnetic component with a first frequency; generating a bias magnetic field for counterbalancing any constant magnetic fields parallel to the direction of the fiber; directing electromagnetic waves towards the fiber; receiving electromagnetic waves from the fiber, which are modulated by said first frequency; determining that said received electromagnetic waves are modulated by a second frequency that is the double of said first frequency, upon application of said bias magnetic field in a specific angular direction; and calculating the angular position of the fiber from said angular direction of the bias magnetic field and said modulated magnetic component, wherein two or several index fibers and at least two identity fibers may be arranged, whereby the mutual angles between the index fibers are known; whereby the method further may comprise: calculating the angles between the index fibers; comparing the calculated angles with the known mutual angles; and calculating an inclination of the tag based on the calculated angles and the known angles.

For the calculation of the inclination of the tag the following formula may be used:

$$\tan \alpha' = \tan \alpha * \cos \phi$$

wherein
 $\alpha'$=calculated angle
 $\alpha$=known angle
 $\phi$=inclination of the tag.

Then, the calculated angles for the identity fibers may be corrected for the inclination $\phi$ of the tag.

The fibers may also be arranged according to a self-clocking code.

In another aspect, there is provided a device for performing the above method steps.

BRIEF DESCRIPTION OF THE DRAWINGS

Further objects, features and advantages of the invention will become apparent from the following detailed description of embodiments of the invention with reference to the drawings, in which.

DETAILED DESCRIPTION OF EMBODIMENTS

Below, several embodiments of the invention will be described with references to the drawings. These embodiments are described in illustrating purpose in order to enable a skilled person to carry out the invention and to disclose the best mode. However, such embodiments do not limit the invention. Moreover, other combinations of the different features are possible within the scope of the invention.

Figure 1:
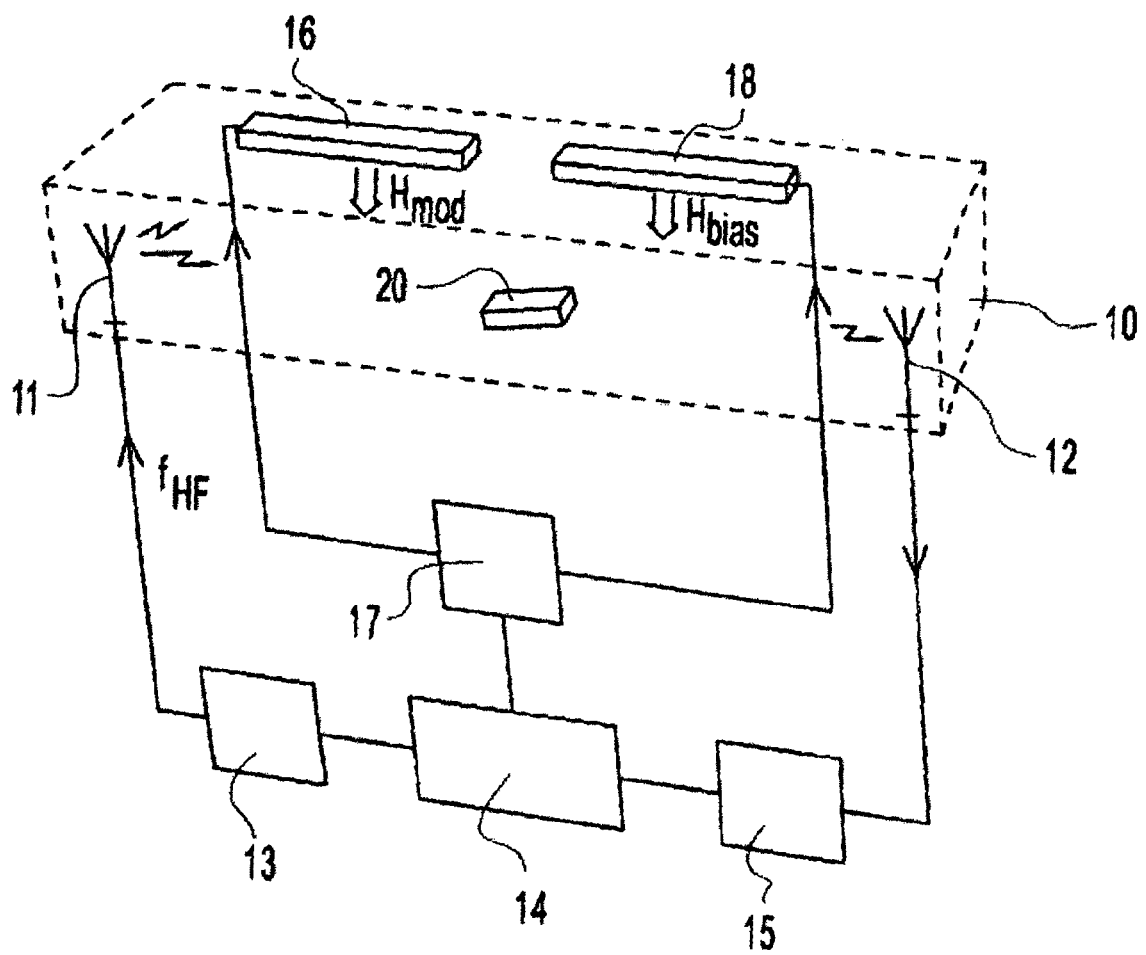
FIG. 1 is a schematic block diagram of an embodiment of the measurement device used in embodiments of the invention. The measurement device is similar to the embodiment described in WO 99/44644
Figure 2:
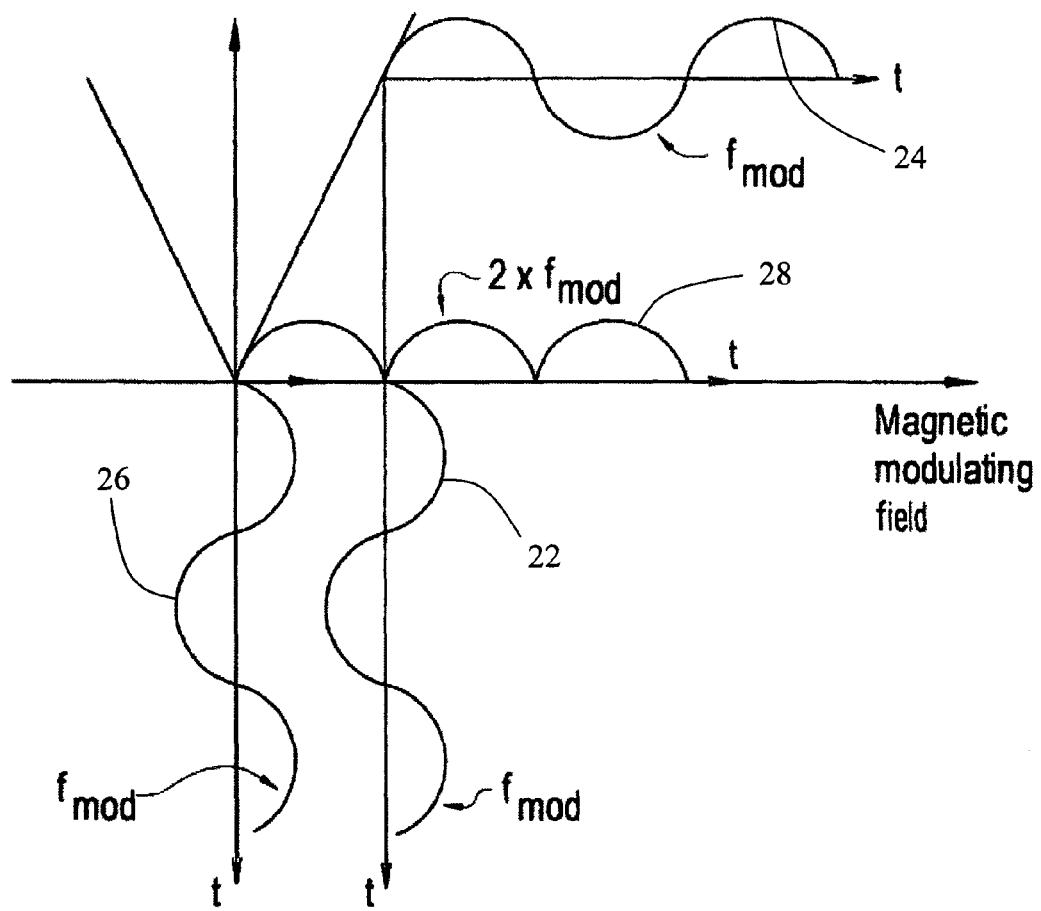
FIG. 2 is diagram of magnetic fields and impedance of sensor elements.

A device in which embodiments of the invention can be used is shown in FIGS. 1 and 2, which are taken from the patent publication WO 99/66466, the technical contents of which is incorporated in the present specification by reference.

An item 20 including a tag comprising several microfibers is arranged inside a measuring space 10, for example passing through the measuring space at a moving belt. The item 20 has a specific orientation in relation to the horizontal of the space 10. A microwave transmitting antenna 11 is arranged at one side of the space 10 and a microwave receiving antenna 12 is arranged at another side of the space 10. Moreover, a first modulated magnetic field source 16 and a second bias magnetic field source 18 are arranged above the space 10. A control device 14 controls the magnetic field sources 16 and 18 via a drive circuit 17. Moreover, the control device 14 generates a microwave signal via transmitter 13, which is fed to the transmitting antenna 11. The microwave signal received by receiving antenna 12 is fed to the control device 14 via a receiver 15.

The microfibers are arranged substantially parallel with the magnetic fields generated by magnetic fields sources 16 and 18 and substantially perpendicular to the microwaves transmitted by antenna 11. Thus, the microfibers may be arranged in a vertical plane, as seen in FIG. 1

The microfibers are exposed to magnetic fields of different sources. Thus, the magnetic field of the earth and other magnetic materials combine with the magnetic fields generated by the magnetic field sources 16 and 18.

The microfibers are of such a type that the impedance of the microfiber is dependent on the magnetic field. If the microfiber is exposed to a modulated magnetic field having a DC component and an AC component, as shown in FIG. 2, the right vertical sine-wave 22, the resulting impedance will be as shown with the upper horizontal since-wave 24. However, if the DC component of the magnetic field in the direction of the microfiber is removed, for example counterbalanced by the bias magnetic field source 18, the situation will be as shown by the left vertical sine-wave 26. Since the microwave impedance is insensitive to the sign of the magnetic field, a rectification of the AC component will occur as shown in the bottom horizontal sine wave 28, and a frequency doubling will be obtained. Thus, if the AC magnetic field component has a frequency of 600 Hz, a frequency component of 1200 Hz will be detectable by the receiver.

Since it is difficult to exactly counterbalance the different sources of static magnetic fields, a magnetic field having constant amplitude, which is larger than all the other DC magnetic sources is applied by the bias magnetic source 18. The magnetic field strength is constant but the field angle is rotated slowly over one revolution, for example by one revolution per second. In this way, the bias magnetic field component in the direction of the microfiber will vary as a sine wave. At two distinct angles of the revolution, the magnetic field component in the direction of the microfiber, i.e. (Hbias*cos α) will exactly counterbalance the DC magnetic field components in the direction of the microfiber and a frequency doubling effect will be obtained. The direction of the microfiber will then be the average of the two angles thus obtained.

However, the direction of the microfiber is determined in relation to a reference plane and line. Since the tag comprises at least two microfibers and more often ten or more microfibers, the angles between the microfibers will be distorted if the tag has an angle in relation to the reference plane and line.

Figure 3:
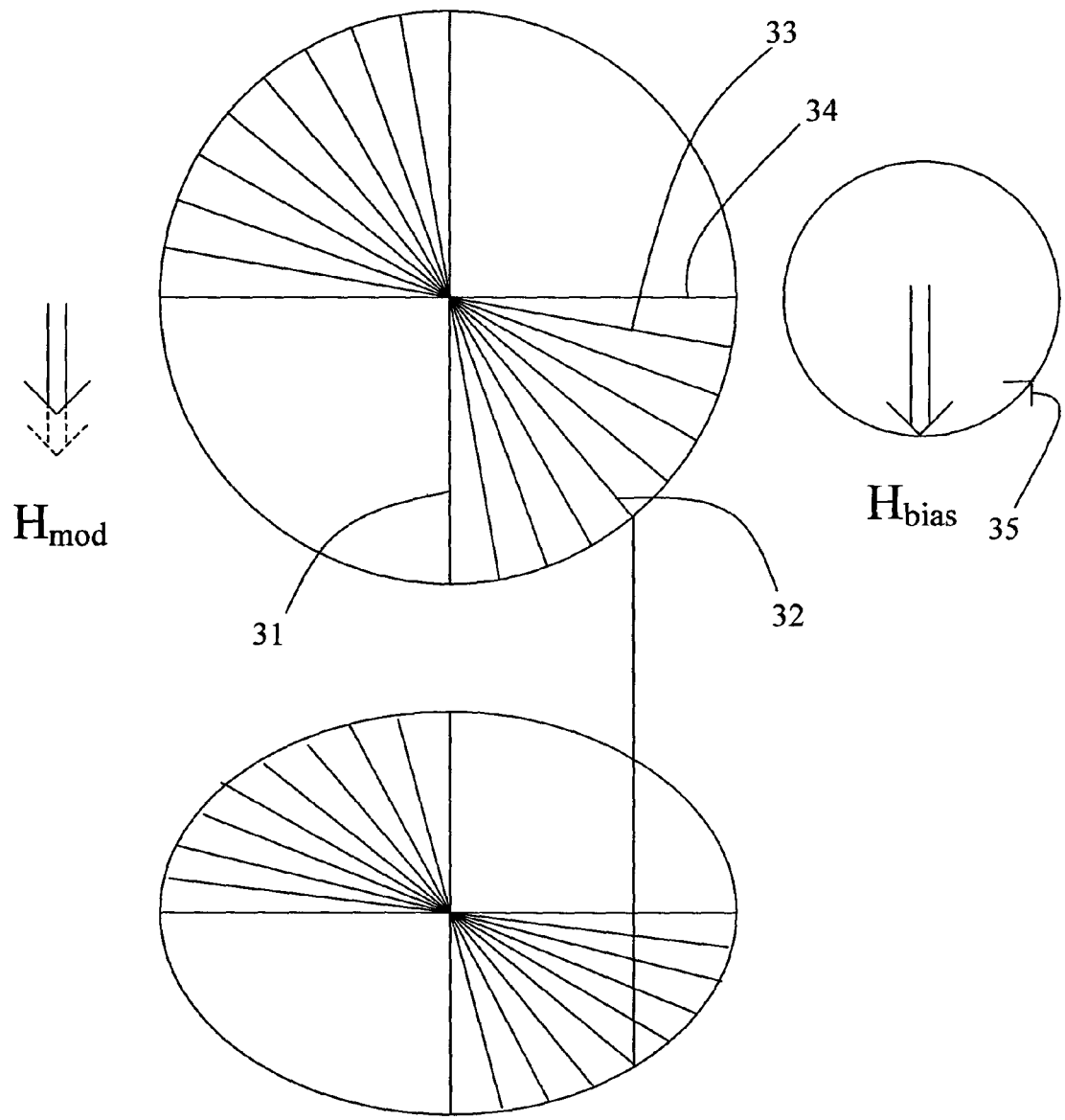
FIG. 3 is a schematic diagram of microfibers arranged in specific patterns, and the result of an inclination of the plane of the microfibers.

FIG. 3 shows a vertically arranged tag having 10 microfibers arranged with a mutual angle of 10°. The tag is vertical and is sensed by the device as shown in FIG. 1. The modulation magnetic field is shown by arrow Hmod and extends vertically and has a modulated amplitude as shown by the arrows in broken line. The bias magnetic field is shown by arrow Hbias and has constant amplitude but is rotated as shown by arrow 35.

The microwaves are directed towards the microfibers of the tag perpendicular to the paper plane.

The modulation magnetic field Hmod will induce a magnetic field in the microfiber 31 extending vertically. The bias magnetic field, which has an amplitude, which is larger than the DC component of the modulation magnetic field, will counterbalance, said DC component at for example angles 160 degrees and 220 degrees. Thus, the system will determine that the direction angle of the microfiber 31 is 180 degrees.

For the second microfiber 32 having an angle of 40 degrees in relation to the first microfiber, the system will determine that the bias magnetic field will counterbalance the DC component at for example 185 and 255 degrees, resulting in the angle of 220 degrees. However, the modulation amplitude will be lower in the second microfiber 32, since only about 77% of the modulation amplitude will be in the direction of the fiber. The situation for the fiber 33 will be still worse, with only 17% of the modulation being in the direction of the fiber, and fiber 34 will have substantially no modulation.

This problem can be solved by providing the modulation magnetic field in two directions in sequence, one as shown in FIG. 3 and another perpendicular to the one shown in FIG. 3 shortly thereafter, and make measurement with both magnetic fields.

Another manner would be to provide the modulation of the modulation magnetic field as a rotating field modulation.

A further manner would be to maintain the bias magnetic field as a slowly rotating magnetic field with constant amplitude.

Figure 4:
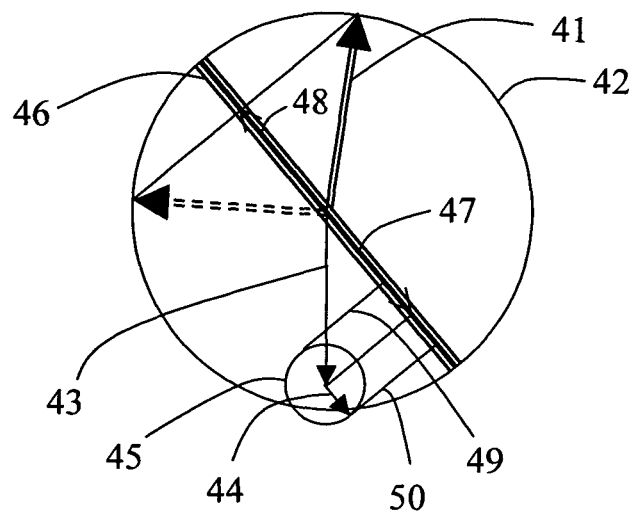
FIG. 4 is a circular diagram of the magnetic field vectors.

The different options are described with reference to FIG. 4.

The bias field Hbias is shown as a double line arrow 41 having constant amplitude but a varying angular position indicated by the circle 42. The rotational rate of field 41 may be a slow rotation of for example one revolution per second.

The DC field from the modulation magnetic field and other magnetic fields, such at the earth magnetism, is indicated as a single arrow 43. The DC field has an amplitude, which is smaller than the bias field Hbias 41.

The DC field 43 is modulated with a modulation magnetic field 44, being a rotating magnetic field as indicated by the circle 45. The field 44 is rotated with a medium rotational speed, for example 10 revolutions per second. The field 44 is also amplitude modulated by a high frequency of for example 600 Hz.

A microfiber 46 is arranged at an arbitrary angle to be measured by the system. In this case, the angle is 40° in relation to a reference line (not shown). The DC field 43 projects as a vector 47 on the microfiber 46 and the rotating field 44 will vary between lines 49 and 50, both due to the amplitude modulation of a high frequency (600 Hz) and due to the rotation with a medium frequency (10 Hz). The vector 47 will be balanced in the direction of the microfiber by a vector 48 when the bias field 41 is in the position shown with solid lines and when the bias field is in the position shown with broken lines. The angle of the microfiber can be determined as the average of the two angles of the bias field 41 as well by the angular position of the vector 44 when the amplitude modulation of the double high frequency (1200 Hz) is maximum or minimum.

Another way to operate the system would be to have the bias vector 41 adjustable in both direction and amplitude. The bias vector 41 is adjusted so that it balances the vector 43, thereby effectively moving the circle 45 to the center of the circle 42. In this case, the direction of the microfiber can be determined by the angular position of the vector 44 when the amplitude modulation of high frequency is maximum or minimum. The direction and size of the bias vector 41 when it balances the vector 43 can be determined as the situation when the circle 44 is in the middle of circle 42, in which case there is minimum received component having the basic high frequency (600 Hz) but all components are of double frequency (1200 Hz).

Figure 5:
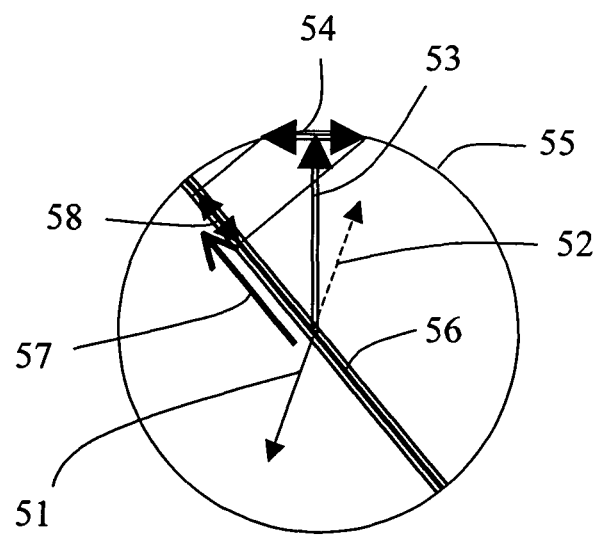
FIG. 5 is another circular diagram of the magnetic field vectors.

A further manner to operate the system is shown in FIG. 5. A stationary magnetic field vector 51, comprising the earth magnetic field and any other magnetic field in the vicinity of the tag is compensated by a static magnetic field vector 52. This vector 52 is adjusted during the set up of the equipment and is checked and adjusted when needed. A modulation magnetic field comprising two vectors 53 and 54 is arranged to rotate as shown by the circle 55. The magnetic field vector 53 has a constant amplitude. The vector is rotated along the circle 55, for example one revolution per second. The magnetic field vector 54 is perpendicular to the magnetic field vector and has an amplitude that oscillates with a high frequency of for example 600 Hz. The magnetic field vector 54 is also rotated together with the vector 53. Since the magnetic field vector 54 is oscillating, it is shown as a double directed arrow. The net magnetic field acting in the longitudinal direction of a microfiber 56 comprises a DC component 57 and an AC component 58. Since the DC component 57 is larger than the amplitude of the AC component 58, no frequency doubling will occur, compare the situation in FIG. 2, curves 22 and 24. However, if the microwire 56 is perpendicular to the vector 53 and parallel to the vector 54, the DC component 57 will be substantially zero and the AC component 58 will be maximum, and a frequency doubling will occur, similar to the situation shown in FIG. 2, curves 26 and 28. Thus, if a frequency doubled signal is received, the system will determine that a microfiber is present in an angular position which is perpendicular to the vector 53. The resolution of the system is dependent on the relationship between the vector 53 and the amplitude of the vector 54. The smaller the amplitude is and the larger the vector 53 is, the better the resolution will be. If the vector 53 is zero, substantially the situation described in the previous paragraph is obtained.

Reference is now made to the bottom portion of FIG. 3. The tag may be inclined so that the circular arrangement of the fibers in the upper portion of FIG. 3 becomes projected as an ellipse as seen by the system. If the tag is inclined 45 degrees in relation to the vertical plane, the angles will be distorted according to the following, wherein the first numeral is the angle in the vertical tag and the second numeral is the corresponding angle of a tag inclined by 45 degrees: 0°→0°; 10°→7°; 20°→14.3°; 30°→22.0°; 40°→30.4°; 50°→39.8°; 60°→50.5°; 70°→62.5°; 80°→75.9°; 90°→90°. As can be seen the angles close to the x-axis are compressed while the angles close to the y-axis are expanded. In this case, the ratio between expansion and compression is about 2. Theoretically, it should be $(\cos \phi)^2$ wherein $\phi$ is the angle of inclination of the circle or the plane of the tag.

Thus, some kind of calculations is needed for converting an angle read by the system to a correct angle at the tag plane.

One way of solving the problem is to provide several index microfibers, for example 10 microfibers at a mutual angle of 10 degrees as shown in FIG. 3. When, the angles are read by the system, the differences or ratios between adjacent angles are determined. Since transformation from a circle to an ellipse essentially means a multiplication of $\tan \alpha$ with $\cos \phi$, where $\alpha$ is the angle of the microfiber relative to the rotation line 34, and $\phi$ is the inclination of the circle to obtain the ellipse, it is possible to transform the ellipse to a circle.

Since the tag may be inclined in two directions, i.e. along fiber 31 and along fiber 34, further calculations are required, since rotation around the other rotation axis means a division with $\cos \psi$, wherein $\psi$ is the inclination angle of the tag in the second direction. Iteration may be required to obtain the correct orientation.

By providing several further identification or identity microfibers between the index microfibers, the angular position of such identification microfibers may be determined, which makes it possible to identify the tag and the article to which the tag is attached.

Above has been exemplified that the index fibers have a mutual angle of 10 degrees, but any suitable angle can be used, and the angles between the index microfibers do not need to be the same, but can be different. For example, three index microfibers can be used with mutual angles of 10 and 40 degrees.

Another manner to solve the problem (to be used separately or in combination) would be to use a self-clocking code. Such codes are known from EAN systems. One example is that an original digital number to be decoded is transformed to a code in which there are never two "0" following each other. One way to do this is to arrange that "0" means a shift of the meaning of the following digit. An example makes things more clear.

Suppose that the digit 11000011000101011 should be transformed to a shifting code. The shifting code always starts with two "1" as a start sequence. If the next digit is a "1", the code will comprise "1" as many times as there are initial "1" is the digit, in this case 2 times. Thus, the shifting code so far is 1111 . . . . Then follows a "0". This means that the shifting code inserts a "0" indicating that the next digit is shifted, in this case from a "1" to a "0". Then follows as many "1" as there are "0" in the original digit. In the present case there are four "0", which means that the shifting code so far becomes: 111101111 . . . . Then, the original digit shifts to "1":s and there are two "1", which results in: 111101111011 . . . . Now the principle is clear and the entire translation of the original digit into the shifting code is:

11000011000101011
111101111011011101010101111

As seen, the code also ends with two "1".

The shifting code is constructed to that there are never two "0" following each other. This can be used in the following way. Suppose that microfibers are arranged in a pattern with a microfiber at each angle number, i.e. a microfiber at 1°, 2°, 3°, 4°, . . . , 30°, and that a "1" means presence of a microfiber and "0" means absence of a microfiber at a specific angle number. At reading such a number of microfibers, it is possible to determine with good accuracy if the distance between two adjacent microfibers is one degree or two degrees. Thus, the code is ease to read, even if the plane of the tag has a large inclination so that the microfibers are arranged according to an ellipse rather than circular. The code is self-clocking.

There are several other codes that are self-clocking, which is known from the field of EAN codes.

The tag should be possible to read when arranged on an item passing a moving line. Then, it would be advantageous if all the equipment were arranged below the line. Such an embodiment is shown in FIG. 6.

Figure 6:
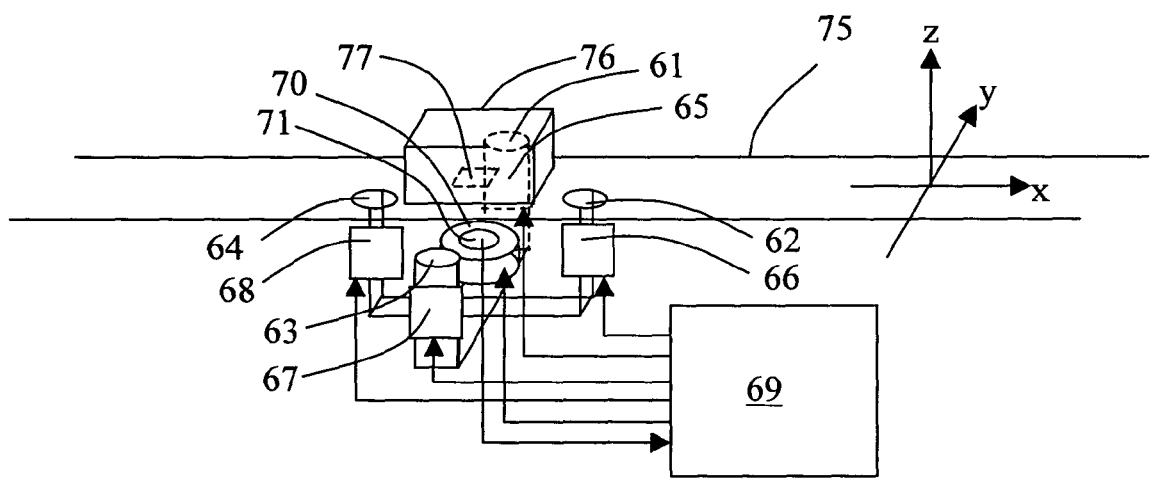
FIG. 6 is a partly schematic side view of a measurement device incorporating the principles of embodiments of the invention.

There is a transportation line 75 that moves for example to the right in FIG. 6. An item 76 provided with a tag 77 at the bottom surface is arranged at the line 75. The tag is provided with several microfibers (not shown) arranged horizontally, parallel to the line 75.

The system comprises a source of magnetic fields comprising four poles 61, 62, 63, 64 arranged below the line in a square orientation. Adjacent the poles are arranged four electromagnetic windings 65, 66, 67, 68 for generating magnetic fields between the poles 61-64. The electromagnetic windings are connected to a control device 69, which may be a computer. The control device 69 generates currents to the magnetic windings so that the magnetic field components discussed above are generated. The magnetic field lines are directed substantially horizontally in an x-direction perpendicular to the line 75 and a y-direction parallel with the line 75 as indicated by a coordinate system 72 shown to the right in FIG. 6. By having four poles, any type of rotation of the magnetic field can be generated.

Microwaves are generated by the control device 69 and delivered to a transmitting antenna 70 arranged directly below the tag 77. Thus, the microwaves are directed perpendicular to the microfibers of the tag. A receiving antenna 70 is arranged coaxially with the transmitting antenna. The receiving antenna is connected to the control device 69. The operation is as indicate above.

The microfibers are of a construction known per se and described in WO 99/44644 mentioned above. Basically, the microwave is a thin fiber of a material the high impedance of which is modulated by a magnetic field arranged along the fiber. The material may have a Giant Magnetoimpedance. Further information about the fiber may be found in WO 97/29463 and WO 97/29464, the technical contents of which are incorporated in the present specification by reference. The fiber may have a length of 5-100 mm.

The diameter of the fiber is much smaller than the length. In an embodiment, the diameter is 7-200 μm.

The fiber may be coated by glass or another dielectric material.

The microwave may have a frequency of between 1 GHZ and 50 GHz

The modulation frequency of the magnetic field is of a high frequency of for example between about 50 Hz to 5000 Hz or even larger.

The rotation rate of the modulation magnetic field vector, if it is rotated, is of a medium rate, for example 5 to 50 Hz.

The rotation rate of the bias magnetic field, if rotated, is of a low rate, for example 0.2-5 Hz.

The microfibers have been shown arranged inside a circle and crossing each other at the center of the circle. However, the microfibers can be arranged anywhere in the tag, for example in a triangular pattern if three microfibers are used, or arbitrary in the tag.

The different features, members and embodiments can be combined in further embodiments, as appears to the skilled person.

Although the present invention has been described above with reference to specific embodiment, it is not intended to be limited to the specific form set forth herein. Rather, the invention is limited only by the accompanying claims and, other embodiments than the specific above are equally possible within the scope of these appended claims. The different separate features described in the respective embodiments may be used in any other embodiment or in any other combination than expressly described and shown on the drawings.

In the claims, the term "comprises/comprising" does not exclude the presence of other elements or steps. Furthermore, although individually listed, a plurality of means, elements or method steps may be implemented by e.g. a single unit. Additionally, although individual features may be included in different claims, these may possibly advantageously be combined, and the inclusion in different claims does not imply that a combination of features is not feasible and/or advantageous. In addition, singular references do not exclude a plurality. The terms "a", "an", "first", "second" etc do not preclude a plurality. Reference signs in the claims are provided merely as a clarifying example and shall not be construed as limiting the scope of the claims in any way.

The invention claimed is:

1. A method for determining the position of a tag by detecting directions of at least two fibers arranged in the tag intended to be attached to an item for identification of said item, said fibers having an impedance for high frequency electromagnetic waves, which impedance is dependent on a magnetic field at said fiber, comprising:
   generating a modulation magnetic field having an amplitude modulated magnetic component with a first modulation frequency;
   generating a bias magnetic field for counterbalancing any constant magnetic fields parallel to the direction of the fiber;
   directing electromagnetic waves towards the fiber;
   receiving electromagnetic waves from the fiber, which are modulated by said first modulation frequency;
   determining that said received electromagnetic waves are modulated by a second frequency, which is the double of said first modulation frequency, upon application of said bias magnetic field in a specific angular direction; and
   calculating the angular position of the fiber from said angular direction of the bias magnetic field and said modulated magnetic component,
   arranging at least three index fibers and at least two identity fibers, whereby the mutual angles between the index fibers are known;
   calculating the angles between the index fibers;
   comparing the calculated angles with the known mutual angles;
   calculating an inclination of the tag based on the calculated angles and the known angles.

2. The method according to claim 1, wherein calculation of an inclination of the tag comprises:
   using the formula:

$$\tan \alpha' = \tan \alpha * \cos \phi$$

wherein
   $\alpha'$=calculated angle
   $\alpha$=known angle
   $\phi$=inclination of the tag
   for calculating the inclination angle $\phi$.

3. The method according to claim 1, further comprising:
   calculating angles of the identity fibers,
   correcting the calculated angles for an inclination $\phi$ of the tag.

4. The method according to claim 1, wherein the fibers are arranged according to a self-clocking code.

5. A device for detecting the position of a tag based upon the directions of at least two fibers arranged in the tag intended to be attached to an item for identification of said item, said fibers having an impedance for high frequency electromagnetic waves, which impedance is dependent on a magnetic field at said fiber, comprising:
   a modulation magnetic field having an amplitude modulated magnetic component with a first frequency;
   a bias magnetic field for counterbalancing any constant magnetic fields parallel to the direction of the fiber;

a transmitting antenna for directing electromagnetic waves towards the fiber;

a receiving antenna for receiving electromagnetic waves from the fiber, which are modulated by said first frequency;

a control device for determining that said received electromagnetic waves are modulated by a second frequency that is the double of said first frequency, upon application of said bias magnetic field in a specific angular direction; and a calculating device for calculating the angular position of the fiber from said angular direction of the bias magnetic field and said modulated magnetic component, wherein at least two index fibers and at least two identity fibers are arranged at the tag, whereby the mutual angles between the index fibers are known;

said calculating device being arranged to calculate the angles between the index fibers and comparing the calculated angles with the known mutual angles and calculating an inclination of the tag based on the calculated angles and the known angles.

6. The device according to claim 5, wherein calculating an inclination of the tag uses the formula:

$$\tan \alpha' = \tan \alpha * \cos \phi$$

wherein
 $\alpha'$=calculated angle
 $\alpha$=known angle
 $\phi$=inclination of the tag
 for calculating the inclination angle $\phi$.

7. The device according to claim 5, wherein the fibers are arranged according to a self-clocking code.

8. The device according to claim 5, wherein said transmitting antenna and said receiving antenna are arranged coaxially.

9. The device according to claim 6, wherein the fibers are arranged according to a self-clocking code.

10. The device according to claim 6, wherein said transmitting antenna and said receiving antenna are arranged coaxially.

11. The device according to claim 7, wherein said transmitting antenna and said receiving antenna are arranged coaxially.

* * * * *